(12) United States Patent
Coady et al.

(10) Patent No.: US 11,403,315 B2
(45) Date of Patent: Aug. 2, 2022

(54) REPORTING AND KNOWLEDGE DISCOVERY FOR DATABASES

(71) Applicant: Bank of America Corporation, Charlotte, NC (US)

(72) Inventors: Jason Sy Coady, Harrison, NJ (US); Gregory J. Capello, Yardley, PA (US); Manu J. Kurian, Dallas, TX (US)

(73) Assignee: Bank of America Corporation, Charlotte, NC (US)

( * ) Notice: Subject to any disclaimer, the term of this patent is extended or adjusted under 35 U.S.C. 154(b) by 52 days.

(21) Appl. No.: 16/690,374

(22) Filed: Nov. 21, 2019

(65) Prior Publication Data

US 2021/0157804 A1 May 27, 2021

(51) Int. Cl.
*G06F 17/00* (2019.01)
*G06F 16/248* (2019.01)
*G06F 16/242* (2019.01)
*G06F 40/103* (2020.01)
*G06F 40/186* (2020.01)
*G06F 16/25* (2019.01)

(52) U.S. Cl.
CPC .......... *G06F 16/248* (2019.01); *G06F 16/242* (2019.01); *G06F 16/252* (2019.01); *G06F 40/103* (2020.01); *G06F 40/186* (2020.01)

(58) Field of Classification Search
None
See application file for complete search history.

(56) References Cited

U.S. PATENT DOCUMENTS

| | | |
|---|---|---|
| 5,721,903 A | 2/1998 | Anand et al. |
| 5,781,911 A | 7/1998 | Young et al. |
| 5,913,214 A | 6/1999 | Madnick et al. |
| 5,953,707 A | 9/1999 | Huang et al. |
| 6,397,192 B1 | 5/2002 | Notani et al. |
| 6,714,979 B1 | 3/2004 | Brandt et al. |
| 7,051,038 B1 | 5/2006 | Yeh et al. |
| 7,143,107 B1 | 11/2006 | Nebres, Jr. |
| 7,197,508 B1 | 3/2007 | Brown, III |

(Continued)

FOREIGN PATENT DOCUMENTS

| | | |
|---|---|---|
| EP | 1401181 A1 | 3/2004 |
| EP | 2479688 A2 | 7/2012 |

(Continued)

*Primary Examiner* — Mustafa A Amin

(57) ABSTRACT

A database reporting device that includes a network interface in signal communication with a database. The network device further includes a processor configured to receive a report request comprising a project key and to identify data records associated with the project key. The processor is further configured to identify a report template for a user associated with the report request and to identify data record element types corresponding with sections of the identified report template. The processor is further configured to generate a search query for data record elements corresponding with the identified data record element types and to send the search query to the database. The network device is further configured to receive a plurality of data record elements, to populate the report template with data record elements that correspond with data record element types for each section, and to output a report based on the populated report template.

20 Claims, 8 Drawing Sheets

(56) References Cited

U.S. PATENT DOCUMENTS

| | | |
|---|---|---|
| 7,516,127 B2 | 4/2009 | Starch |
| 7,546,312 B1 | 6/2009 | Xu et al. |
| 7,801,929 B2 | 9/2010 | Williamson |
| 7,865,867 B2 | 1/2011 | Keene Potter et al. |
| 7,869,944 B2 | 1/2011 | Deaton et al. |
| 7,870,012 B2 | 1/2011 | Katz et al. |
| 7,890,543 B2 | 2/2011 | Hunt et al. |
| 8,380,742 B2 | 2/2013 | Kiziltune et al. |
| 8,402,425 B2 | 3/2013 | Deb et al. |
| 8,725,767 B1 * | 5/2014 | Wood .................. G06F 21/6218 707/781 |
| 8,756,496 B2 * | 6/2014 | Vedula .................. G06F 40/103 715/255 |
| 8,856,182 B2 | 10/2014 | Olson |
| 8,983,900 B2 | 3/2015 | Hegde et al. |
| 9,189,507 B2 | 11/2015 | Ursal et al. |
| 9,191,380 B2 | 11/2015 | Anderson et al. |
| 9,251,247 B2 | 2/2016 | Bruckner et al. |
| 9,477,698 B2 | 10/2016 | Jagota |
| 9,569,251 B2 | 2/2017 | Beisiegel et al. |
| 9,626,421 B2 | 4/2017 | Plattner et al. |
| 9,940,467 B2 | 4/2018 | Lerner |
| 10,062,459 B2 * | 8/2018 | Pieck ..................... C01G 43/00 |
| 10,142,186 B2 | 11/2018 | Nadaf et al. |
| 2002/0133488 A1 * | 9/2002 | Bellis ..................... G06F 16/903 |
| 2003/0008635 A1 | 1/2003 | Ung et al. |
| 2003/0182303 A1 | 9/2003 | Gibson |
| 2003/0212960 A1 * | 11/2003 | Shaughnessy ........ G06F 40/151 715/210 |
| 2005/0021516 A1 | 1/2005 | Potter et al. |
| 2005/0060284 A1 | 3/2005 | Ruby et al. |
| 2005/0114321 A1 | 5/2005 | DeStefano et al. |
| 2007/0136318 A1 * | 6/2007 | Clark .................... G06F 16/951 |
| 2008/0082495 A1 | 4/2008 | Polo-Malouvier et al. |
| 2008/0162562 A1 | 7/2008 | Hu et al. |
| 2009/0037236 A1 | 2/2009 | Miller et al. |
| 2009/0292592 A1 | 11/2009 | Shapira et al. |
| 2010/0114815 A1 * | 5/2010 | Longin ............... G06F 16/9038 707/603 |
| 2010/0153466 A1 | 6/2010 | Burger |
| 2011/0035744 A1 | 2/2011 | Bhatia |
| 2011/0265163 A1 * | 10/2011 | Mahanor ............. G06Q 10/103 726/7 |
| 2011/0270832 A1 | 11/2011 | Le Stum |
| 2013/0179313 A1 * | 7/2013 | Basu ..................... G06Q 40/10 705/30 |
| 2013/0332473 A1 | 12/2013 | Ryman |
| 2014/0244627 A1 | 8/2014 | Bhatia |
| 2015/0006552 A1 * | 1/2015 | Lord ................... G06F 16/2455 707/752 |
| 2017/0132721 A1 * | 5/2017 | Riley ....................... G09C 1/00 |
| 2017/0262142 A1 * | 9/2017 | Riley ................... G06F 3/04847 |
| 2019/0370893 A1 * | 12/2019 | Gandhi ................ G06F 3/04815 |
| 2020/0065307 A1 * | 2/2020 | Roy .................... G06F 3/04842 |

FOREIGN PATENT DOCUMENTS

| | | |
|---|---|---|
| EP | 2199745 B1 | 8/2019 |
| WO | 9939294 A1 | 8/1999 |
| WO | 2004095312 A1 | 11/2004 |
| WO | 03067474 A2 | 8/2009 |
| WO | 2016000037 A1 | 1/2016 |

\* cited by examiner

| | 124A | 124B | 124C | 124D | 124E | 124F | 124G | 124H | 124I | 124J | 124K | 112 |
|---|---|---|---|---|---|---|---|---|---|---|---|---|
| | Record Identifier | Summary | Due Date | Status | Status Identifier | Assignee | Created Date | Updated Date | Approver | Dependencies | Deliverables | Project Key |
| 122A | ABC-3199 | Infrastructure Requirements | 8/30/2019 | Open | Green | Name 1, Name 2 | 7/29/2019 | 7/29/2019 | Name 6 | | Infrastructure Requirements | Project Key 1 |
| 122B | ABC-2366 | Core Component Production Release | 10/31/2019 | In Progress | | Name 3, Name 4 | 8/6/2019 | 8/13/2019 | Name 7 | ABC-3199, ABC-2323 | Production Release Documentation | Project Key 1 |
| 122C | ABC-2324 | Devops Defects | | Open | Red | Name 5 | 8/3/2019 | 8/13/2019 | | ABC-3139 | | Project Key 1 |
| 122D | ABC-2323 | Core Execution Framework Defects | | In Progress | | Name 1, Name 2 | 7/23/2019 | 8/4/2019 | | | | Project Key 1 |
| 122E | DEF-4587 | Deliverable One | 12/31/2019 | Pending | | | 6/1/2019 | | | | | Project Key 2 |
| 122F | GHI-7894 | Deliverable Two | 2/1/2019 | Pending | | | 6/1/2019 | | | | | Project Key 3 |

*FIG. 2*

LEADERSHIP

| PROJECT MANAGER: NAME 1 | BUSINESS SPONSOR: NAME 2 | TECH SPONSOR: NAME 3 |
|---|---|---|
| SUMMARY AND UPDATES<br>• PROJECT IS ON SCHEDULE<br>• DEBUGGING IN PROGRESS | DELIVERABLES<br><br>TITLE    STATUS<br>1. DELIVERABLE 1 - IN PROGRESS<br>2. DELIVERABLE 2 - IN PROGRESS<br>3. DELIVERABLE 3 - OPEN<br>4. DELIVERABLE 4 - PENDING APPROVAL | |
| ROADBLOCKS<br>• NONE | | |
| ISSUES, RISKS, AND MITIGATION<br>• INTEGRATION CHALLENGES DUE TO INSUFFICIENT TESTING | | |
| DEPENDENCIES<br>• PROJECT 1<br>• PROJECT 2 | NEXT STEPS<br>• NONE | |
| RECENT ACCOMPLISHMENTS<br>• INFRASTRUCTURE REQUIREMENTS COMPLETE<br>• CORE COMPONENT PRODUCTION RELEASE | | |

*FIG. 7*

REPORTING AND KNOWLEDGE DISCOVERY FOR DATABASES

TECHNICAL FIELD

The present disclosure relates generally to databases, and more specifically to reporting and knowledge discovery for data stored in databases.

BACKGROUND

Many computer systems have expansive networks that include a large number of network devices and databases. These computer systems allow data to be shared among the different network devices and databases. However, retrieving data from a database in a large computer system poses several technical challenges. For example, identifying related information is challenging because information may be stored in different locations within one or more databases. In addition, identifying related information is also challenging because data records may be in different formats and/or may comprise different types of information. This means that two data records may be associated with the same set of data despite being completely different from each other. Performing an exhaustive search for related information is impractical because performing an exhaustive search on such a large search space consumes a large amount of processing resources which degrades the performance of the computer system. After identifying related data records, another technical challenge is to efficiently extract information from the data records. This is a challenge because data records may each contain large amounts of data. Trying to extract all of the data is also impractical and consumes a significant amount of processing power and network resources. In addition, extracting large amounts of data introduces latency when performing a search and reduces the throughput of the computer system.

SUMMARY

The system disclosed in the present application provides a technical solution to the technical problems discussed above by using project keys and report templates to extract data from databases. The disclosed system provides several practical applications and technical advantages which include 1) a process for efficiently identifying and extracting data from related data records in a database; and 2) a process for generating a personalized report for a user based on the extracted data.

In one embodiment, an information system is configured to receive a report request comprising a project key. For example, the information system may receive the report request from a user to request information from a database. The information system is configured to identify one or more data records that are associated with the project key. In contrast to existing systems which lack the ability to track related information, the information system uses project keys to track and identify which data records are related to each other. The information system is further configured to identify a report template for the user that is associated with the report request. A report template defines a layout for visually representing data for the user. Report templates may be personalized for each user and may identify types of information to present to the user. For example, the report template may comprise a plurality of sections that are each associated with one or more data record element types. The data record element types indicate the type of information that goes within each section of the report template. The information system identifies the data record element types that correspond with the sections of the report template to determine which information to extract from the database.

The information system generates a search query for data record elements corresponding with the identified data record element types from among the identified data records. Here, the information system reduces the search space for the requested information by first identifying which data records comprise information associated with the report request and then by identifying a subset of data record elements within the identified data records. This process reduces the amount of process resources and network resources that are consumed to obtain the requested information. The information system sends the search query to a database and receives a plurality of data record elements from the identified data records in response to sending the search query. The information system populates the report template with data record elements that correspond with data record element types for each section of the report template to generate a report and then outputs the report to the user.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 2 is an example of data records from a database;

FIG. 7 is an example report generated based on a report template; and

DETAILED DESCRIPTION

Information System Overview

Figure 1:
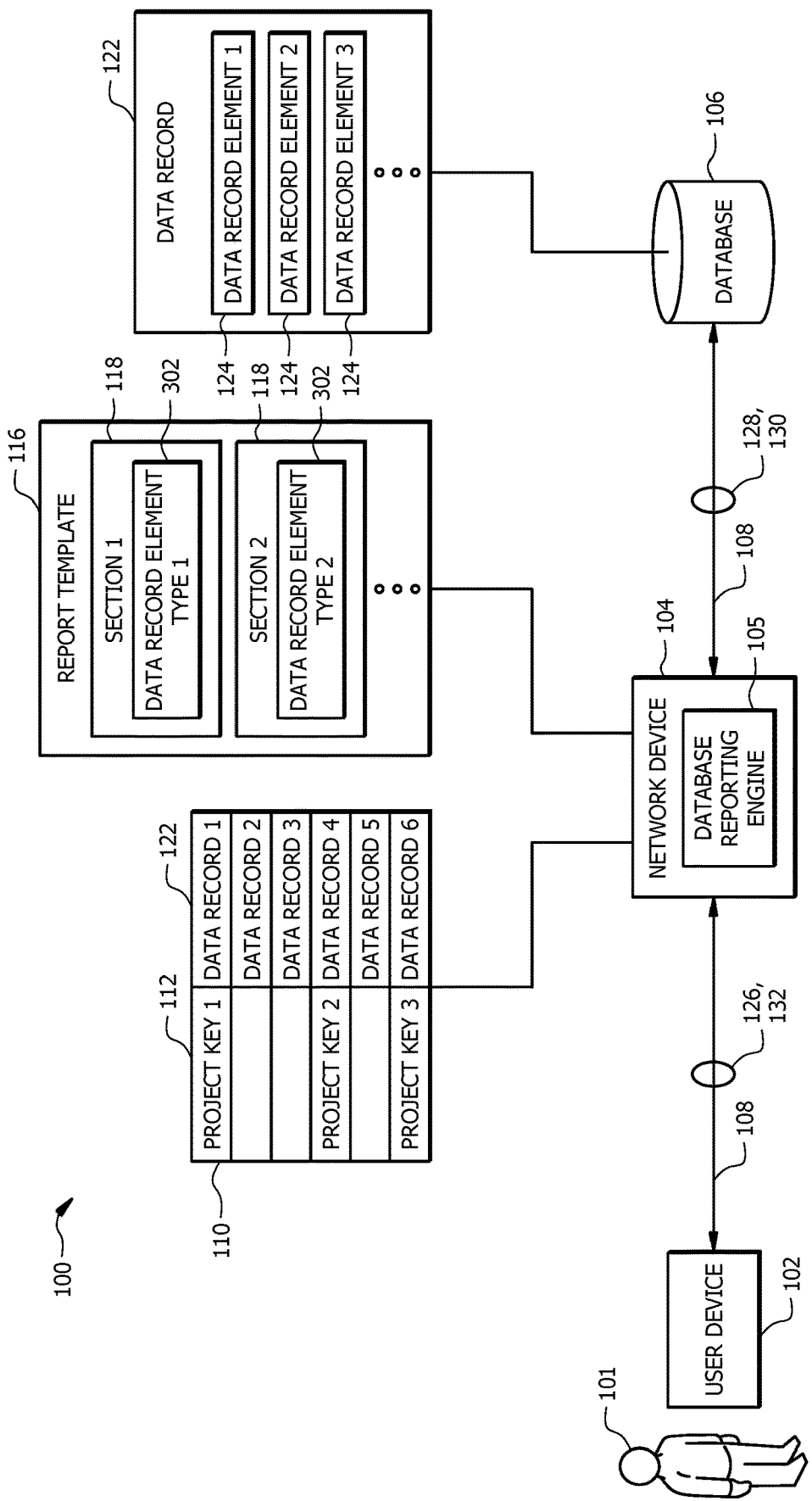
FIG. 1 is a schematic diagram of an information system configured to provide reporting and knowledge discovery for data stored in databases.

FIG. 1 is a schematic diagram of an information system 100 configured to provide reporting and knowledge discovery for data stored in databases 106. In one embodiment, the information system 100 comprises a network device 104 that is in signal communication with one or more user devices 102 and one or more databases 106 in a network 108. The information security system 100 may be configured as shown or in any other suitable configuration.

The network 108 may be any suitable type of wireless and/or wired network including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network 108 may be configured to support any suitable type of communication protocol as would be appreciated by one of ordinary skill in the art.

Databases

In one embodiment, a database 106 is a device that is external from the network device 104. For example, a database 106 may be a data store, a server, a network attached storage (NAS) device, a computing device, a shared folder, or any other suitable type of network device. In another embodiment, a database 106 may be integrated with a memory (e.g. memory 804) of the network device 104. The database 106 may be configured to store data records 122, files, and/or any other suitable type of data.

Network Device

In one embodiment, the network device 104 comprises a database reporting engine 105, a project key map 110, and report templates 116. Additional information about the hardware configuration of the network device 104 is described in FIG. 8. The network device 104 is generally configured to receive request from a user device 102 for information that is stored in a database 106. Examples of user devices 102 include, but are not limited to, mobile devices (e.g. smart phones or tablets), computers, laptops, or any other suitable type of device. As an example, a user 101 may use their user device 102 to send a report request 126 to the network device 104 to request information that is associated with a project. In this example, the requested information may comprise information from multiple data records 122 that are stored in disparate location within one or more databases 106. In addition, each data record 122 may have a different format and/or may comprise different types of information. Referring to FIG. 2 as an example, each data record 122 (shown as data records 122A, 122B, 122C, 122D, 122E, and 122F) comprises a different combination of data record elements 124 (shown as data record elements 124A, 124B, 124C, 124D, 124E, 124F, 124G, 124H, 124I, 124J, and 124K). Each data record element 124 corresponds with a different type of information. In this example, the data record elements 124 associated with the data records 122 comprise a record identifier, a summary, a due date, a status, a status identifier, an assignee, a created date, an updated date, an approver, dependencies, and deliverables. In other examples, data record elements 124 may comprise any other suitable information types and/or combination of information types.

Retrieving the request information from a database 106 poses several technical challenges. For example, identifying related information within the database 106 is challenging because the information may be stored in different locations in one or more databases 106. Identifying the related information is also challenging because each data record 122 may be in a different format and/or may have different types of information. This means that that two data records 122 may be associated with the same set of data despite being completely different from each other. Referring to FIG. 2 as an example, data records 122A and 122D may be associated with the same set of data (e.g. project information) even though they each comprise information for a different combination of data elements 124 and they do not reference each other. In other words, they do not have any data record elements 124 that reference other data records 122.

Returning to FIG. 1, the network device 104 uses a project key map 110 to track and associate data records 122 using a project key 112. A project key 112 is a unique identifier (e.g. an alphanumeric identifier) that can be used to reference one or more data records 122 or data record identifiers. In the example shown in FIG. 1, a first project key 112 is linked with a first data record 122 identifier, a second data record 122 identifier, and a third data record 122 identifier. A second project key 112 is linked with a fourth data record 122 identifier and a fifth data record 122 identifier. A third project key 112 is linked with a sixth data record 122 identifier. The network device 104 is configured to use the project key map 110 to identify data records 122 that are associated with one another. This process allows the network device 104 to identify related data records 122 despite the data records 122 comprising information for a different combination of data elements 124 and/or not having any data elements 124 that reference each other data records 122. In one embodiment, the project key map 110 comprises information identifying databases 106 where the identified data records 122 are stored. This information can be used by the network device 104 to generate a targeted search query that can be sent to each database 106 to identify and extract information that is stored within database 106.

After identifying related data records 122, another technical challenge is to extract information from the data records 122 so that the information can be presented in a legible or useful manner to the user 101. Once again this is a challenge because each data record 122 may be in a different format and/or may have different types of information. The network device 104 provides a technical solution that employs custom logic for extracting information based on a report template 116. A report template 116 defines a layout for visually representing data. Each report template 116 is configured to identify which types of information to extract from a data record 122 and to provide formatting instructions for generating a report 132. A report template 116 comprises a plurality of sections 118 that are each configured to present information (e.g. data record elements 124) from one or more data records 122.

Figure 3:
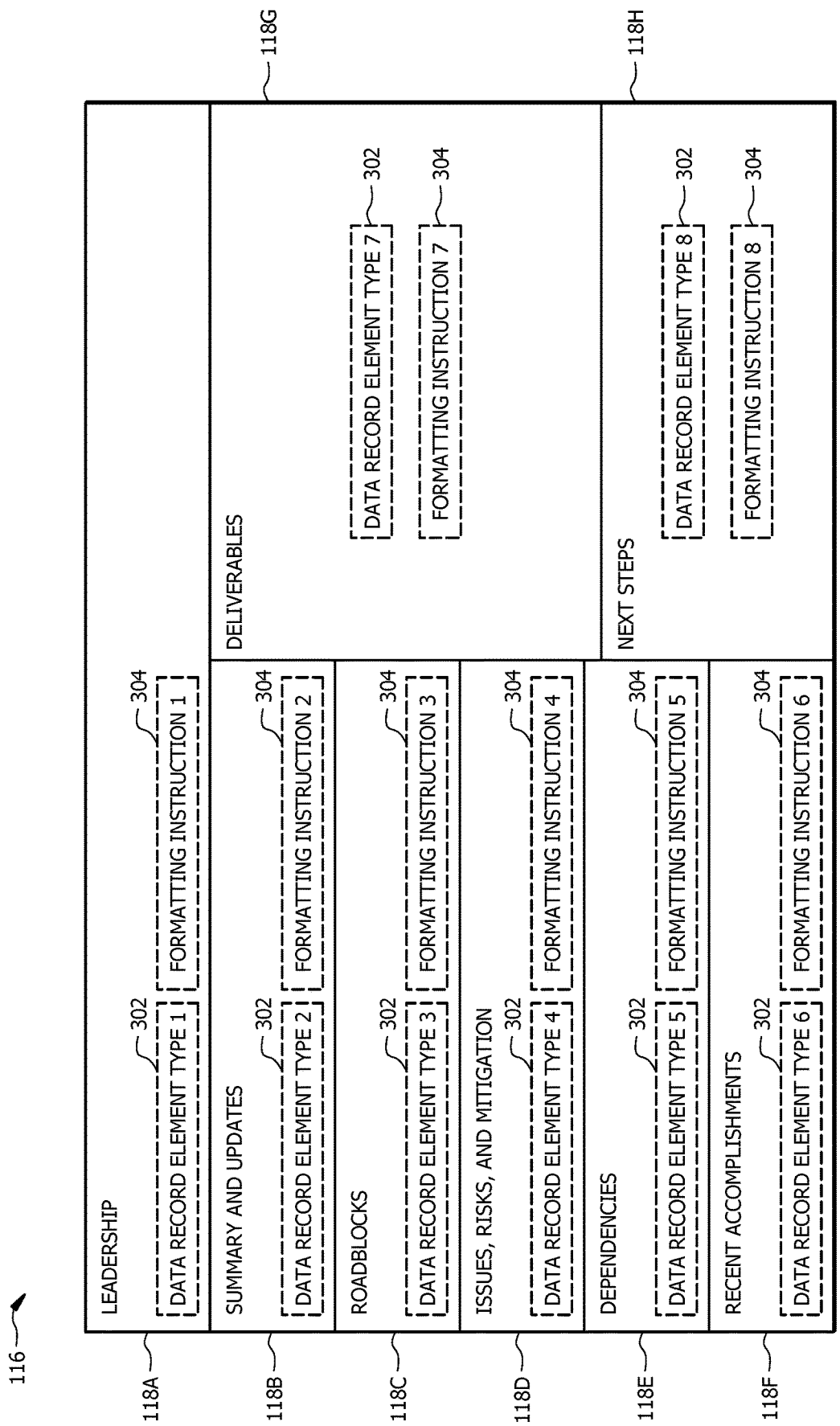
FIG. 3 is an example of a report template.

Referring to FIG. 3 as an example, the report template 116 defines a layout for presenting information to a user 101. For example, the report template 116 may define a layout for presenting information to a user 101 on a web browser or on an application. In this example, the report template 116 comprises a leadership section 118A, a summary & updates sections 118B, a roadblocks section 118C, an issues, risks, & mitigation section 118D, a dependencies section 118E, a recent accomplishments section 118F, a deliverables section 118G, and a next step sections 118H. In other examples, a report template 116 may comprise any other type and/or combination of sections 118. Each section 118 is associated with one or more data record element types 302 that identify types of data record elements 124 that are used to populate the section 118.

The network device 104 is further configured to provide a report 132 that is populated with the extracted information based on the user 101 using a report template 116. Using a report template 116 allows the network device 104 to determine which types of information the user 101 is interested in and to extract the identified types of information from the data records 122. An example of a process for generating a report 132 based on a report template 116 is described in FIG. 4. This process allows the network device 104 to generate a report 132 that personalized to the user 101. The generated report 132 may comprise a subset of information that is of interest to the user 101. The generated report 132 may also be formatted based on the user's 101 preferences.

In addition, the network device 104 may be further configured to generate new representations (e.g. interdependency maps 500 or scheduling charts 600) based on the data that is extracted from a database 106 which enables knowledge discovery. For example, the network device 104 may employ method 400 to extract data from a database 106 in response to receiving a request and to generate a mapping that identifies interdependencies between different data record elements 124 from the request. For instance, a user 101 may request information about different tasks and deliverables for a project. This information may be distributed among a plurality of data records 122 that are stored in a database 106. In response to receiving the request, the network device 104 extracts information from the database 106 that is associated with the project and identifies any interdependencies between the tasks and deliverables for the project based on the data records 122 associated with the project. As another example, the network device 104 may generate a scheduling chart 600 that identifies the timing (e.g. start times and deadlines) associated with the tasks and deliverables for the project based on the data records 122 associated with the project. An example of the network device 104 performing these operations is described below in FIG. 4.

Database Reporting Process

Figure 4:
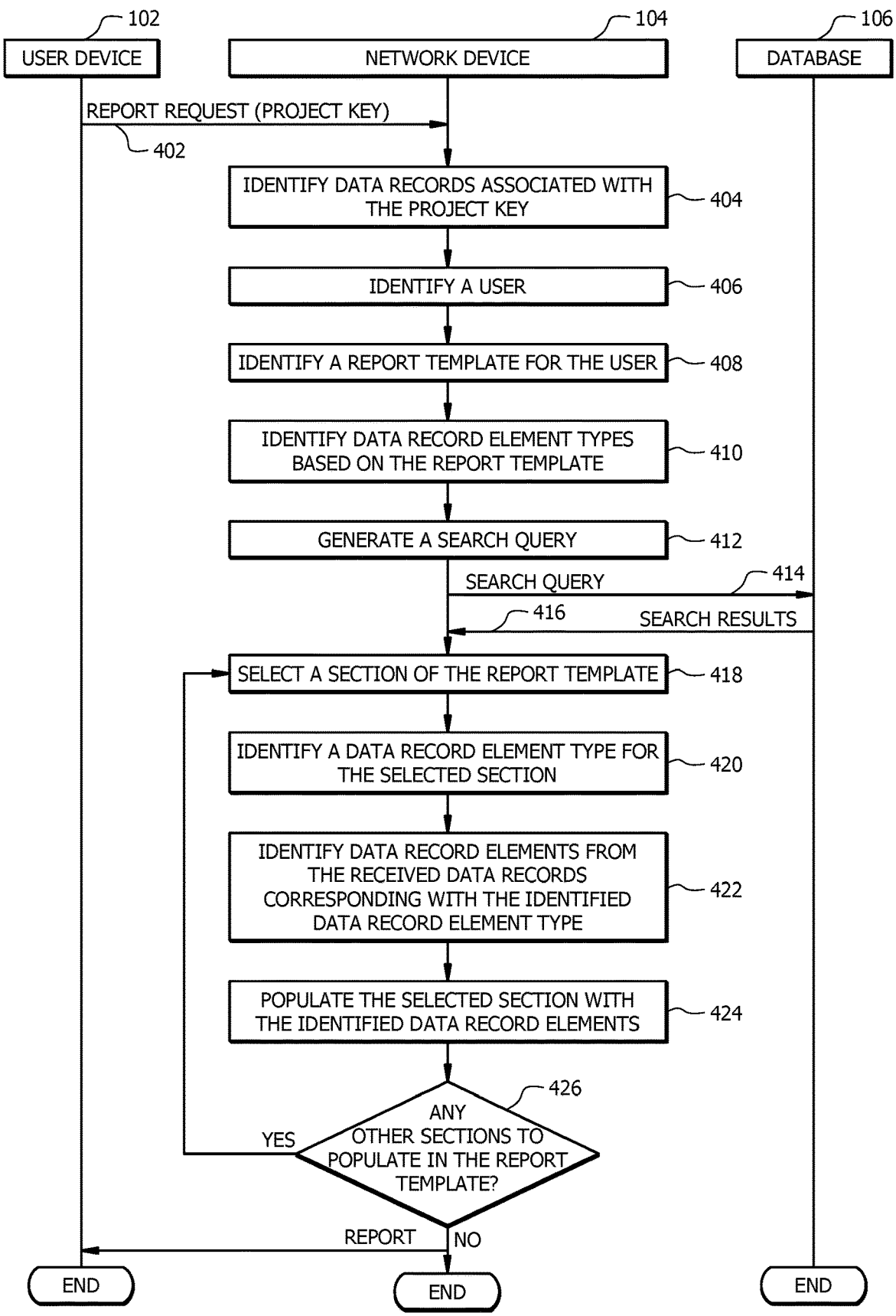
FIG. 4 is a protocol diagram of an embodiment of a database reporting method.

FIG. 4 is a protocol diagram of an embodiment of a database reporting method 400. The network device 104 may employ method 400 to efficiently identify and extract related information from a database 106. The network device 104 may also use method 400 to generate a visual representation of the extracted information that is personalized for the user 101.

At step 402, the user device 102 sends a report request 126 to the network device 104. The report request 126 comprises a project key 112 that is linked with one or more data records 122 that are stored in the database 106. In one embodiment, a user 101 may send a report request 126 via a graphical user interface on the user device 102. For example, the user 101 may provide a project key 112 to a search field in an application or on webpage. As another example, the user 101 the may provide a Uniform Resource Locator (URL) address to a web browser that comprises the project key 112. For example, the user 101 may append the project key 112 to the end of the URL. In other examples, the user 101 may provide the project key 112 using any other suitable technique.

The report request 126 further comprises a user identifier that identifies a user 101 associated with the report request 126. Examples of user identifiers include, but are not limited to, a name, an email address, an employee number, or any other suitable type of identifier for the user 101. This process allows the requested report 132 to be personalized for the user 101 based on their identity. In one embodiment, the user device 102 obtains the user identifier from the user 101 when the user 101 logs in or accesses the user device 102 to generate the report request 126. In other embodiments, the report request 126 may further comprise any other suitable type of information. The user device 102 generates the report request 126 and sends the report request 126 to the network device 104. The user device 102 may send the report request 126 to the network device 104 using any suitable type communication and/or messaging protocol.

At step 404, the network device 104 identifies data records 122 associated with the project key 112. The network device 104 uses a project key map 110 to identify any data records 122 that are associated with the project key 112. For example, the network device 104 may use the project key 112 from the report request 126 as a search token to identify data records 122 in the project key map 110 that are associated with the project key 112. In some embodiments, the network device 104 may also identify one or more databases 106 that are storing the identified data records 122 using the project key map 110.

Users 101 may be associated with different report templates 116 which allows the network device 104 to provide each user 101 with a personalized report 132. At step 406, the network device 104 identifies the user 101 associated with the report request 126. The network device 104 uses the user identifier (e.g. an employee number or an email address) that is provided in the report request 126 to identify the user 101.

At step 408, the network device 104 identifies a report template 116 for the user 101. The network device 104 may use the user identifier for the user 101 to identify a report template 116 that is associated with the user 101. In this case, the report template 116 may be personalized to a particular user 101. As another example, the network device 104 may use the user identifier to determine the user's 101 role or title (e.g. job title) and then identifies a report template 116 for the user 101 based on their title. In this case, the report template 116 may be personalized based on the user's 101 title. This configuration allows information to be presented to the user 101 based on its relevance to their position. For instance, a report template 116 for an executive may comprise different information than a report template 116 for a project manager. As another example, the network device 104 may determine a permission or access level for the user 101 and then identifies a report template 116 for the user 101 based on their permission or access level. This configuration provided information access control and allows some information to be filtered (e.g. restricted or redacted) based on the user's 101 permission or access level. In other examples, the network device 104 may identify a report template 116 for the user 101 based on any other suitable attributes associated with the user 101, or combinations thereof.

At step 410, the network device 104 identifies data record element types 302 based on the report template 116. Referring to FIG. 3 as an example, each section 118 in the report template 116 is associated with a data record element type 302. Each data record element type 302 corresponds with one or more data record elements 124 of a data record 122. For instance, the network device 104 may identify the summary & updates section 118B of the report template 116. In this example, the summary & updates section 118B may be associate with a data record element type 302 that corresponds with data record elements 124 that are associated with summaries or updates. The network device 104 may repeat the process of identifying data record element types 302 that are associated with the sections 118 of the report template 116.

Once the network device 104 identifies data record element types 302 that are associated with the sections 118 of the report template 116 for the user 101, the network device 104 generates a search query 128 to request data for populating the report template 116. Here, the network device 104 reduces the search space for the requested information by first identifying which data records 122 comprise information associated with the report request 126 and then identifying a subset of data record elements 124 within the identified data records 122. At step 412, the network device 104 generates a search query 128 for the data record elements 124 from the identified data records 122. Once the network device 104 identifies the data records 122 that are associated with the project key 112 and the data record element types 302 associated with a report template 116 for the user, the network device 104 then generates a search query 128 to request data record elements 124 corresponding with the identified data record element types 302 from the identified data records 122. In one embodiment, the network device 104 uses an Application Programming Interface (API) to generate the search query 128. For example, the API may provide one or more functions or commands that the network device 104 can use to request information from the database 106. At step 414, the network device 104 sends the search query 128 to one or more databases 106 that are storing the previously identified data records 122.

At step 416, the network device 104 receives search results 130 from the database 106 in response to the search query 128. The search results 130 comprises data record elements 124 from the identified data records 122. This process allows the network device 104 to receive data or a subset of data from the identified data records 122 without having to receive complete data records 122. This allows the network device 104 to consume less memory resources and reduces the amount of network consumption that is used to transmit the requested data.

Once the network device 104 receives data associated with the report request 126, the network device 104 then populates the report template 116 with the received data to generate a report 132 for the user 101. At step 418, the network device 104 selects a section 118 of the report template 116. For example, the network device 104 may iteratively select sections 118 from the report template 116 to populate with data.

At step 420, the network device 104 identifies the data record element type 302 for the selected section 118. As discussed above in step 410, each section 118 of the report template 116 is associated with one or more data record element types 302 that identifies the type of data record elements 124 that are used to populate a corresponding section 118 of the report template 116.

At step 422, the network device 104 identifies data record elements 124 from the received data that corresponds with the identified data record element type 302. Here, the network device 104 extracts information from the received search results 130 that corresponds with the identified data record element type 302. Continuing with the previous example, the network device 104 may select the summary & updates section 118B of the report template 116 and may extract information from data record elements 124 that are associated with summaries or updates from the data in the search results 130.

At step 424, the network device 104 populates the selected section 118 with the identified data record elements 124. Once the network device 104 identifies and extracts the data record elements 124 that are associated with the selected section 118, the network device 104 then populates the section 118 with the extracted information. In some embodiments, the report template 116 may provide formatting instructions 304 for each section 118 of the report template 116. For example, the report template 116 may indicate that data in the selected section 118 should be formatted using bullet points or a numbered list. In other examples, the report template 116 may provide instructions to bold, underline, italicize, or any other suitable type of formatting instructions. The formatting instructions 304 may be specific to each section 118 and may be different from other sections 118 in the report template 116. For example, the report template 116 may comprise a first set of formatting instructions 304 for a first section 118 of the report template 116 and a second set of formatting instructions 304 for a second section 118 of the report template 116. In this example, the first formatting instructions 304 may be different from the second formatting instructions 304. The network device 104 populates the selected section 118 in accordance with the formatting instructions 304 provided by the report template 116.

Figure 5:
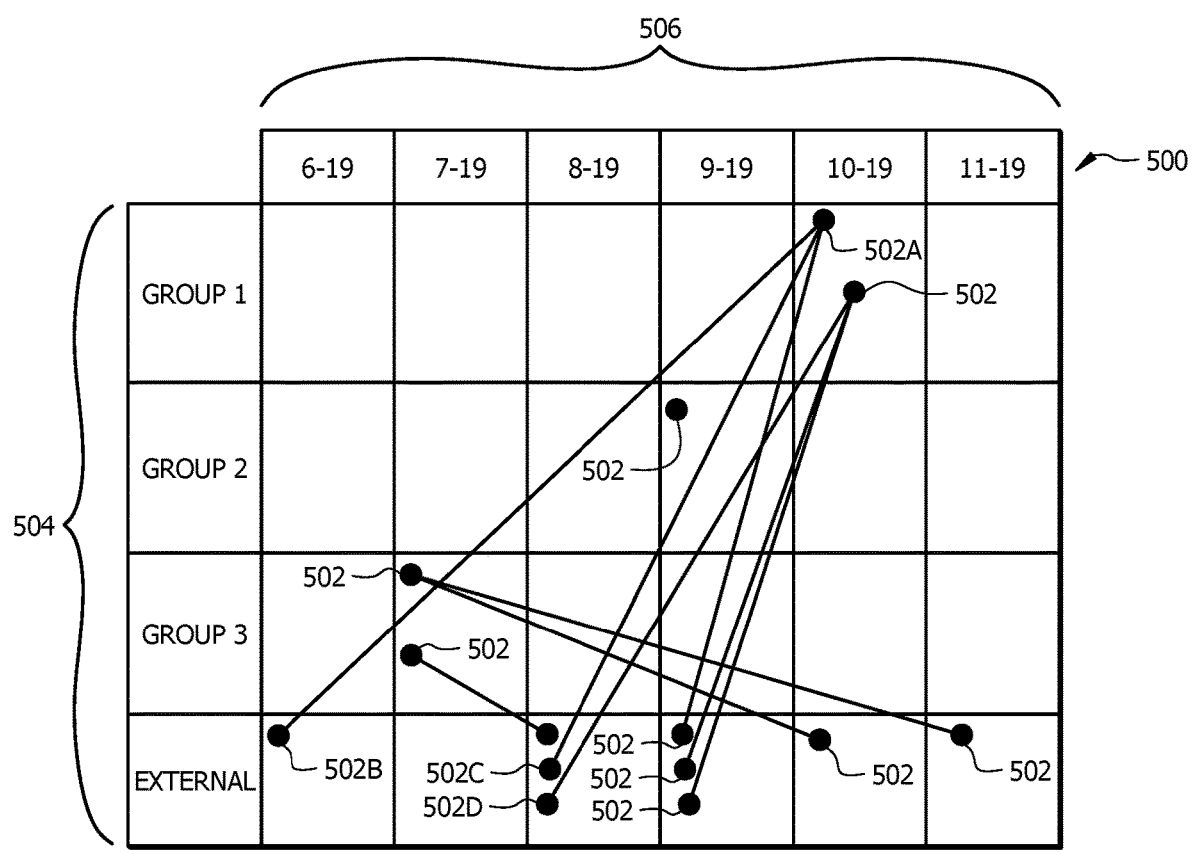
FIG. 5 is an example of an interdependency map.

In one embodiment, the network device 104 may be configured to generate an interdependency map 500 for the selected section 118. An interdependency map 500 is configured to identify when a task 502 is due, whether any other tasks 502 (e.g. deliverables) are linked with the task 502, and the party responsible for the task 502. As an example, the network device 104 may generate an interdependency map 500 by identifying tasks 502, any associated dates (e.g. start dates or due dates), any associated groups or parties, and any related tasks 502 in the received search results 130. Referring to FIG. 2 as an example, the network device 104 may identify tasks 502 using a record identifier (e.g. data record element 124A). The network device 104 may also identify due dates (e.g. data record elements 124C), assignees (e.g. data record element 124F), and dependencies with other tasks 502 (e.g. data record element 124J). The network device 104 may then generate an interdependency map 500 based on the identified tasks 502 and the information associated with the tasks 502. Referring to FIG. 5 as an example, the interdependency map 500 plots a plurality of tasks 502 based on the assignees 504 that are assigned to a task 502 and the due date 506 of the task 502. In this example, points in the interdependency map 500 represent individual tasks 502 and lines represent dependencies between tasks 502. For example, task 502A has a dependency with tasks 502B, 502C, and 502D. This means that tasks 502B, 502C, and 502D need to be completed before task 502A can be completed.

Figure 6:
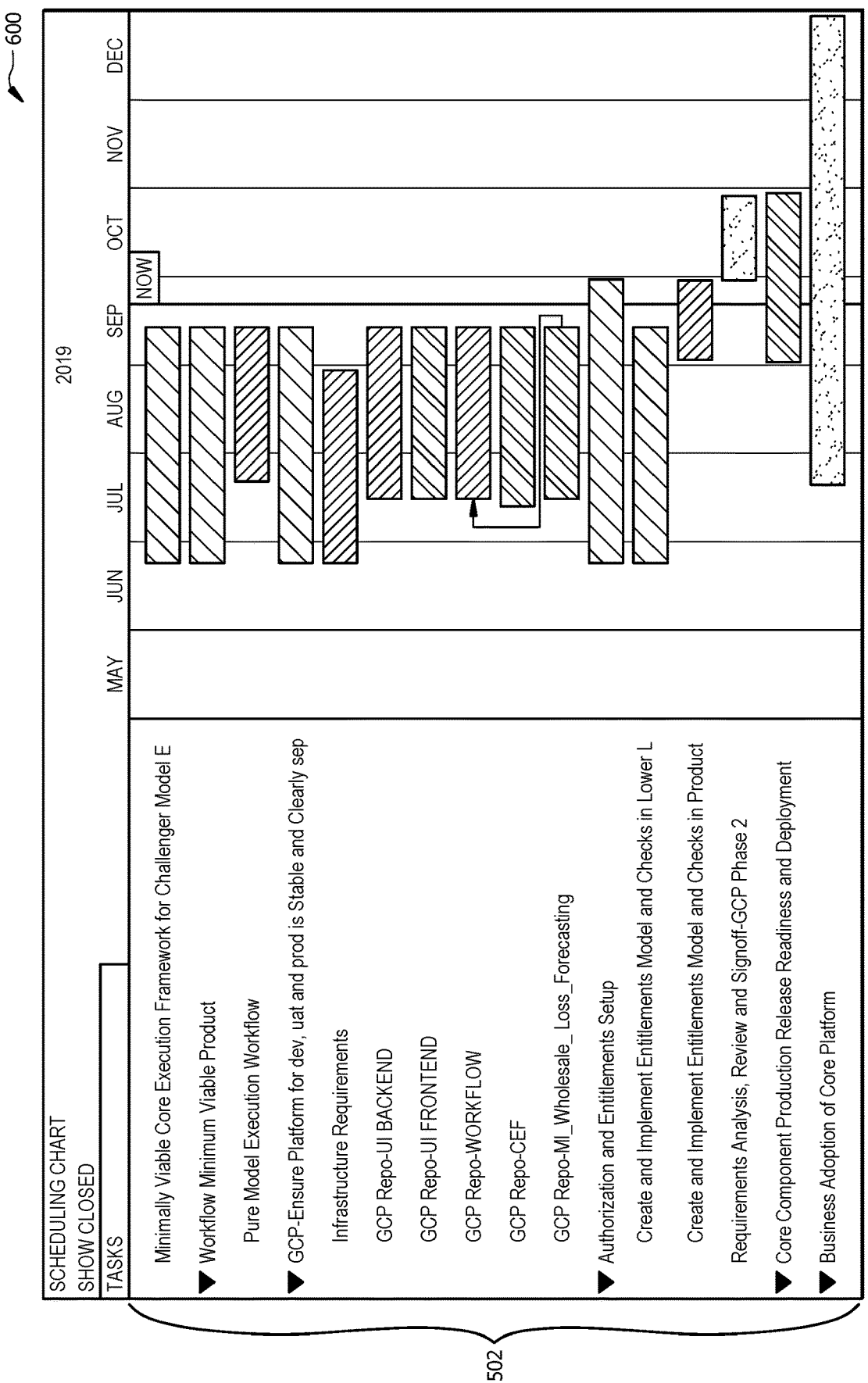
FIG. 6 is an example of a scheduling chart.

In one embodiment, the network device 104 is configured to generate a scheduling chart 600 for the selected section 118. A scheduling chart 600 is configured to present scheduling information associated with various tasks 502. The network device 104 may generate a scheduling chart 600 by identifying tasks 502 and any associated dates (e.g. start dates and due dates) for the tasks 502 in the received search results 130. The network device 104 may then generate the Gannt chart 600 based on the identified information. Referring to FIG. 6 as an example, the scheduling chart 600 comprises a plurality of durations that are each associated with one of the identified tasks 502. A duration is defined as a period of time between an identified start date and due date for a task 502. In this example, a duration for a task 502 is represented as a bar graph. The durations associated with each task 502 are displayed in parallel with other tasks 502 which allows the user 101 to readily see the timing associated with various tasks 502.

Once the network device 104 has populated the selected section 118, the network device 104 checks whether any other sections 118 in the report template 116 need to be filled in with data. Returning to FIG. 4 at step 426, the network device 104 determines whether there are any other sections 118 to populate in the report template 116. For example, the network device 104 may check whether there any sections 118 in the report template 116 that have not been populated with data or previously selected. The network device 104 may determine that there are no sections 118 left to populate when all of the sections 118 of the report template 116 have been populated with data.

The network device 104 returns to step 418 in response to determining that there are other sections 118 to populate in the report template 116. Here, the network device 104 returns to step 418 to select another section 118 in the report template 116 to populate with data from the search results 130. The network device 104 may repeat steps 418-426 until all of the sections 118 of the report template 116 have been populated with data.

Returning to step 426, the network device 104 proceeds to step 428 in response to determining that there are no other sections 118 left to populate in the report template 116. In other words, the network device 104 proceeds to step 428 once the report template 116 has been filled in. Here, the network device 104 generates a report 132 based on the filled in report template 116 and sends or provides the generated report 132 to the user device 102. An example of a report 132 that is generated based on the report template 116 is shown in FIG. 7. At step 426, the network device 104 sends the report 132 to the user device 102. For example, the network device 104 may send the report 132 to user device 102 as a webpage in a web browser. As another example, the network device 104 may send the report 132 to the user device 104 as file (e.g. a word document or a presentation). As another example, the network device 104 may generate and send the report 132 as a graphical representation (e.g. a graphical user interface) on an application. In other examples, the network device 104 may send the report 132 to the user device 102 using any other suitable technique.

Network Device Hardware Configuration

Figure 8:
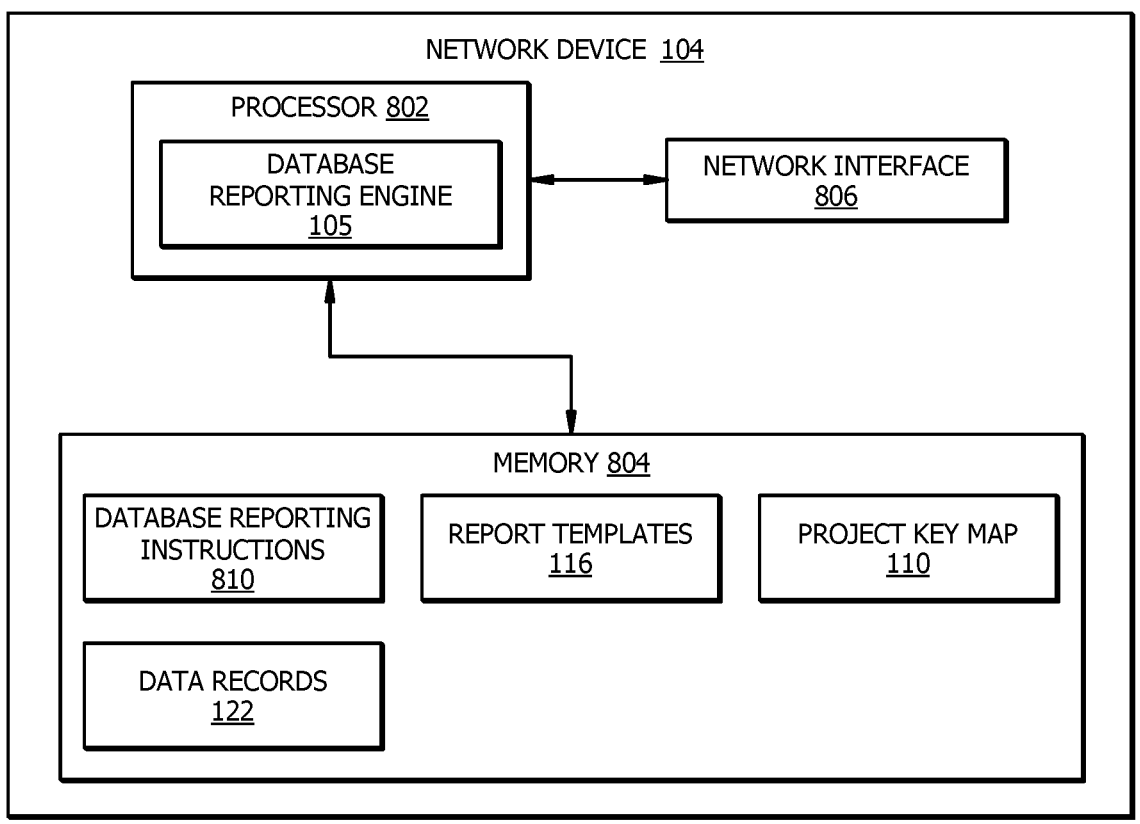
FIG. 8 is an embodiment of a device configured to provide reporting and knowledge discovery for data stored in databases.

FIG. 8 is an embodiment of a device (e.g. network device 104) configured to provide reporting and knowledge discovery for data stored in databases 106. The network device 104 comprises a processor 802, a memory 804, and a network interface 806. The network device 104 may be configured as shown or in any other suitable configuration.

The processor 802 comprises one or more processors operably coupled to the memory 804. The processor 802 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 802 may be a programmable logic device, a microcontroller, a microprocessor, or any suitable combination of the preceding. The processor 802 is communicatively coupled to and in signal communication with the memory 804. The one or more processors are configured to process data and may be implemented in hardware or software. For example, the processor 802 may be 8-bit, 16-bit, 32-bit, 64-bit or of any other suitable architecture. The processor 802 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions to implement a database reporting engine 105. In this way, processor 802 may be a special purpose computer designed to implement the functions disclosed herein. In an embodiment, the database reporting engine 105 is implemented using logic units, FPGAs, ASICs, DSPs, or any other suitable hardware. The database reporting engine 105 is configured operate as described in FIGS. 1 and 4. For example, the database reporting engine 105 may be configured to perform the steps of method 400 as described in FIG. 4.

The memory 804 comprises one or more disks, tape drives, or solid-state drives, and may be used as an over-flow data storage device, to store programs when such programs are selected for execution, and to store instructions and data that are read during program execution. The memory 804 may be volatile or non-volatile and may comprise read-only memory (ROM), random-access memory (RAM), ternary content-addressable memory (TCAM), dynamic random-access memory (DRAM), and static random-access memory (SRAM).

The memory 804 is operable to store database reporting instructions 710, report templates 116, project key maps 110, data records 122, and/or any other data or instructions. The database reporting instructions 710 may comprise any suitable set of instructions, logic, rules, or code operable to execute the database reporting engine 105. The report templates 116, the project key maps 110, and the data records 122 are configured similar to the report templates 116, the project key maps 110, and the data records 122 described in FIGS. 1-6, respectively.

The network interface 806 is configured to enable wired and/or wireless communications. The network interface 806 is configured to communicate data between the network device 104 and other devices (e.g. user devices 102 and/or databases 106), systems, or domain. For example, the network interface 806 may comprise a WIFI interface, a LAN interface, a WAN interface, a modem, a switch, or a router. The processor 802 is configured to send and receive data using the network interface 806. The network interface 806 may be configured to use any suitable type of communication protocol as would be appreciated by one of ordinary skill in the art.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A database reporting method, comprising:
receiving a report request comprising a project key and a user identifier for a user;
searching a project key map using the project key to identify storage locations for two or more data records associated with the project key, wherein the project key map identifies a plurality of project keys, and wherein each project key is a unique identifier that references storage locations for two or more data records;
determine a permission level associated with the user identifier;
identifying a report template for visually representing data from among a plurality of report templates for the user based on the permission level associated with the user identifier, wherein:
each report template defines a layout for visually representing data;
each report template comprises a plurality of sections;
each section is associated with a data record element type for populating a corresponding section; and
the identified report template is configured to filter the data based on the permission level associated with the user;
identifying data record element types corresponding with sections of the identified report template;
generating a search query for data record elements corresponding with the identified data record element types from among the identified data records, wherein the search query identifies the storage locations for the two or more data records that are associated with the project key;
sending the search query to a database;
receiving a plurality of data record elements from the identified data records in response to sending the search query;
identifying a data element type for each data record element;
populating the report template with data record elements that correspond with data record element types for each section of the report template, wherein populating the report template comprises:
identifying a section of the report template;
identifying a data record element type for the identified section; and
populating the identified section with a data record element that matches the data record element type for the identified section; and
outputting a report based on the populated report template.

2. The method of claim 1, wherein identifying the report template is based at least in part on the user identifier.

3. The method of claim 1, wherein:
identifying the report template comprises identifying a role for the user based on the user identifier; and
identifying the report template is based at least in part on the identified role for the user.

4. The method of claim 1, wherein populating the report template comprises:
identifying a plurality of tasks within the received data record elements;
identifying dependencies among the plurality of tasks based on the received data record elements; and
generating a visual representation of the identified dependencies among the plurality of tasks.

5. The method of claim 1, wherein populating the report template comprises:
identifying a plurality of tasks within the received data record elements;
identifying dates associated with the plurality of tasks based on the received data record elements; and
generating a visual representation of the identified dates among the plurality of tasks.

6. The method of claim 1, wherein outputting the report comprises generating a graphical user interface based on the populated report template.

7. The method of claim 1, wherein:
the identified report template comprises formatting instructions for each section of the report template; and
populating the identified report template comprises formatting data for each section of the report template in accordance with the formatting instructions.

8. The method of claim 1, wherein the identified report template comprises:
a first set of formatting instructions for a first section of the report template; and a second set of formatting instructions for a second section of the report template wherein the second set of formatting instructions is different from the first set of formatting instructions.

9. A database reporting device, comprising:
a network interface in signal communication with a database, wherein the database is configured to store a plurality of data records;
a memory operable to store:
a project key map that identifies a plurality of project keys, wherein each project key is a unique identifier that references storage locations for two or more data records; and
a plurality of report templates, wherein:
each report template defines a layout for visually representing data;
each report template comprises a plurality of sections; and
each section is associated with a data record element type for populating a corresponding section; and
a processor operably coupled to the network interface and the memory, configured to:
receive a report request comprising a project key and a user identifier for a user;
search the project key map using the project key to identify storage locations for two or more data records that are associated with the project key;
determine a permission level associated with the user identifier;
identify a report template for visually representing data from among the plurality of report templates for the user based on the permission level associated with the user, wherein the identified report template is configured to filter the data based on permission level associated with the user;
identify data record element types corresponding with sections of the identified report template;
generate a search query for data record elements corresponding with the identified data record element types from among the identified data records, wherein the search query identifies the storage locations for the two or more data records that are associated with the project key;
send the search query to the database;
receive a plurality of data record elements from the identified data records in response to sending the search query;

identify a data element type for each data record element;

populate the report template with data record elements that correspond with data record element types for each section of the report template, wherein populating the report template comprises:
identifying a section of the report template;
identifying a data record element type for the identified section; and
populating the identified section with a data record element that matches the data record element type for the identified section; and output a report based on the populated report template.

10. The device of claim 9, wherein identifying the report template is based at least in part on the user identifier.

11. The device of claim 9, wherein:
identifying the report template comprises identifying a role for the user based on the user identifier; and
identifying the report template is based at least in part on the identified role for the user.

12. The device of claim 9, wherein populating the report template comprises:
identifying a plurality of tasks within the received data record elements;
identifying dependencies among the plurality of tasks based on the received data record elements; and
generating a visual representation of the identified dependencies among the plurality of tasks.

13. The device of claim 9, wherein populating the report template comprises:
identifying a plurality of tasks within the received data record elements;
identifying dates associated with the plurality of tasks based on the received data record elements; and
generating a visual representation of the identified dates among the plurality of tasks.

14. The device of claim 9, wherein outputting the report comprises generating a graphical user interface based on the populated report template.

15. The device of claim 9, wherein:
the identified report template comprises formatting instructions for each section of the report template; and
populating the identified report template comprises formatting data for each section of the report template in accordance with the formatting instructions.

16. The device of claim 9, wherein the identified report template comprises:
a first set of formatting instructions for a first section of the report template; and
a second set of formatting instructions for a second section of the report template wherein the second set of formatting instructions is different from the first set of formatting instructions.

17. A computer program comprising executable instructions stored in a non-transitory computer readable medium that when executed by a processor causes the processor to:
receive a report request comprising a project key and a user identifier for a user;
search a project key map using the project key to identify storage locations for two or more data records associated with the project key, wherein the project key map identifies a plurality of project keys, and wherein each project key is a unique identifier that references storage locations for two or more data records;
determine a permission level associated with the user identifier;
identify a report template for visually representing data from among a plurality of report templates for the user based on the permission level associated with the user identifier, wherein:
each report template defines a layout for visually representing data;
each report template comprises a plurality of sections;
each section is associated with a data record element type for populating a corresponding section; and
the identified report template is configured to filter the data based on the permission level associated with the user;
identify data record element types corresponding with sections of the identified report template;
generate a search query for data record elements corresponding with the identified data record element types from among the identified data records, wherein the search query identifies the storage locations for the two or more data records that are associated with the project key;
send the search query to a database;
receive a plurality of data record elements from the identified data records in response to sending the search query;
identify a data element type for each data record element;
populate the report template with data record elements that correspond with data record element types for each section of the report template, wherein populating the report template comprises:
identifying a section of the report template;
identifying a data record element type for the identified section; and
populating the identified section with a data record element that matches the data record element type for the identified section; and output a report based on the populated report template.

18. The computer program of claim 17, wherein identifying the report template is based at least in part on the user identifier.

19. The computer program of claim 17, wherein:
the identified report template comprises formatting instructions for each section of the report template; and
populating the identified report template comprises formatting data for each section of the report template in accordance with the formatting instructions.

20. The computer program of claim 17, wherein populating the report template comprises:
identifying a plurality of tasks within the received data record elements;
identifying dependencies among the plurality of tasks based on the received data record elements; and
generating a visual representation of the identified dependencies among the plurality of tasks.

* * * * *